(12) United States Patent
Woodstock

(10) Patent No.: US 7,184,076 B2
(45) Date of Patent: Feb. 27, 2007

(54) FLUID-POWERED INSPECTION CAMERA

(75) Inventor: Peter Woodstock, Hampton Hill (GB)

(73) Assignee: Imaging & Sensing Technology Corporation, Horseheads, NY (US)

( * ) Notice: Subject to any disclaimer, the term of this patent is extended or adjusted under 35 U.S.C. 154(b) by 431 days.

(21) Appl. No.: 09/915,126

(22) Filed: Jul. 25, 2001

(65) Prior Publication Data

US 2002/0012049 A1    Jan. 31, 2002

(30) Foreign Application Priority Data

Jul. 27, 2000    (GB)    ................ 0018319.4

(51) Int. Cl.
    *H04N 5/225*    (2006.01)
(52) U.S. Cl. ........................ 348/207; 348/83
(58) Field of Classification Search ................ 348/83, 348/82, 84, 45, 73, 764, 42, 72, 65, 207, 348/143, 373, 358, 68, 85; 382/141
    See application file for complete search history.

(56) References Cited

U.S. PATENT DOCUMENTS

| 2,912,495 | A | * | 11/1959 | Moon et al. | ................ 348/85 |
| 4,424,531 | A |   | 1/1984 | Elter et al. | |
| 4,432,931 | A |   | 2/1984 | Lockett | |
| 5,335,061 | A | * | 8/1994 | Yamamoto et al. | ........ 356/241 |
| 5,394,208 | A | * | 2/1995 | Campbell | ................ 396/429 |
| 5,398,753 | A | * | 3/1995 | Obrejanu et al. | ............ 166/98 |
| 5,903,306 | A | * | 5/1999 | Heckendorn et al. | ........ 348/85 |
| 5,947,051 | A | * | 9/1999 | Geiger | ................ 114/313 |
| 6,158,431 | A | * | 12/2000 | Poole | ................ 128/203.12 |
| 6,407,465 | B1 | * | 6/2002 | Peltz et al. | ................ 290/43 |

FOREIGN PATENT DOCUMENTS

| EP | 0364578 A1 | 4/1988 |
| EP | 0358793    | 9/1988 |
| GB | 2077072 A  | 4/1981 |
| GB | 2107152 A  | 10/1982 |
| JP | 050015029 A | 1/1993 |

* cited by examiner

*Primary Examiner*—Tung Vo
*Assistant Examiner*—Behrooz Senfi
(74) *Attorney, Agent, or Firm*—Nixon Peabody LLP

(57) ABSTRACT

A fluid-powered inspection camera adapted to be operated in a contaminated environment where an electric power supply is not readily available includes a housing having a tubular shell terminating at an open end. An imaging device has a portion arranged within the tubular shell in a spaced relation so as to define an annular chamber therebetween. The imaging device has an eye positioned adjacent to the open end of the body. A compressed fluid-powered motor is arranged within the body and has a compressed fluid inlet adapted to be connected to a suitable source of compressed fluid and also has a compressed fluid outlet. A generator is operatively coupled to the compressed fluid-powered motor and arranged within the body to electrically power the imaging device in proportion to the rate of fluid flow passing through the motor. Compressed fluid discharged from the compressed fluid-powered motor outlet passes through the annular chamber and is discharged through the open end of the body. The compressed fluid supplied to the fluid-powered motor powers and cools the imaging device while keeping clean the eye of the imaging device.

29 Claims, 5 Drawing Sheets

FLUID-POWERED INSPECTION CAMERA

FIELD OF THE INVENTION

The present invention relates generally to the field of cameras, and more particularly, to a fluid-powered inspection camera capable of operating in environments where electrical power is not readily available.

BACKGROUND OF THE INVENTION

Inspection and surveillance cameras are in widespread use today. These are sometimes used in or around hazardous and/or contaminated environments, such as to monitor and view the ignition and/or combustion of a furnace. As used herein, a "contaminated" environment typically contains airborne dust or particulate material that obscures a normal view of an object to be seen. In some applications, notably steel mills, a source of electrical power may not be readily available at the site of the furnace, or it may not be desirable to have unnecessary power cables in such environment. However, compressed air is generally available at various locations near the furnace.

Hence, it would be generally desirable to provide an improved inspection camera for such applications that can be powered by a locally-available source of compressed air or other fluid.

SUMMARY OF THE INVENTION

According to the invention there is provided a fluid-powered inspection device adapted to be operated in a contaminated environment, comprising a body having a tubular shell terminating in an open end, an imaging device having a portion arranged within said tubular shell in spaced relation thereto so as to define an annular chamber therebetween, said imaging device having an eye positioned adjacent said open end, a fluid-powered motor arranged within said body, said motor having a fluid inlet adapted to be connected to a suitable source of compressed fluid and having a fluid outlet, a generator arranged within said body and operatively coupled to said motor, said generator being arranged to supply electrical power to said imaging device as a function of the fluid flow passing through said motor, and wherein the fluid discharged from said motor outlet passes through said annular chamber and is discharged through said open end, whereby the fluid supplied to said motor powers and cools said imaging device and keeps clean said eye.

In this particular embodiment, the fluid is compressed air. However, in other embodiments the device may utilize other fluids, such as nitrogen, etc. The inspection device may be a video camera, a television camera, an infrared camera, or some other type of camera or device. The eye may include a lens, and the flow of fluid discharged from the tube open end is directed so as to cool the eye, and to protect the eye from contaminants in the environment. In another embodiment, the device includes an eductor, which is operatively arranged such that fluid discharged from the motor outlet passes through the eductor and entrains ambient air from within the chamber into the flow discharged through the tube open end. Compressed air supplied from the source may be combined with air discharged from the motor outlet upstream of the eductor. The flow of compressed air is arranged to cool the imaging device, as well as the eye.

DETAILED DESCRIPTION OF THE INVENTION

Figure 1:
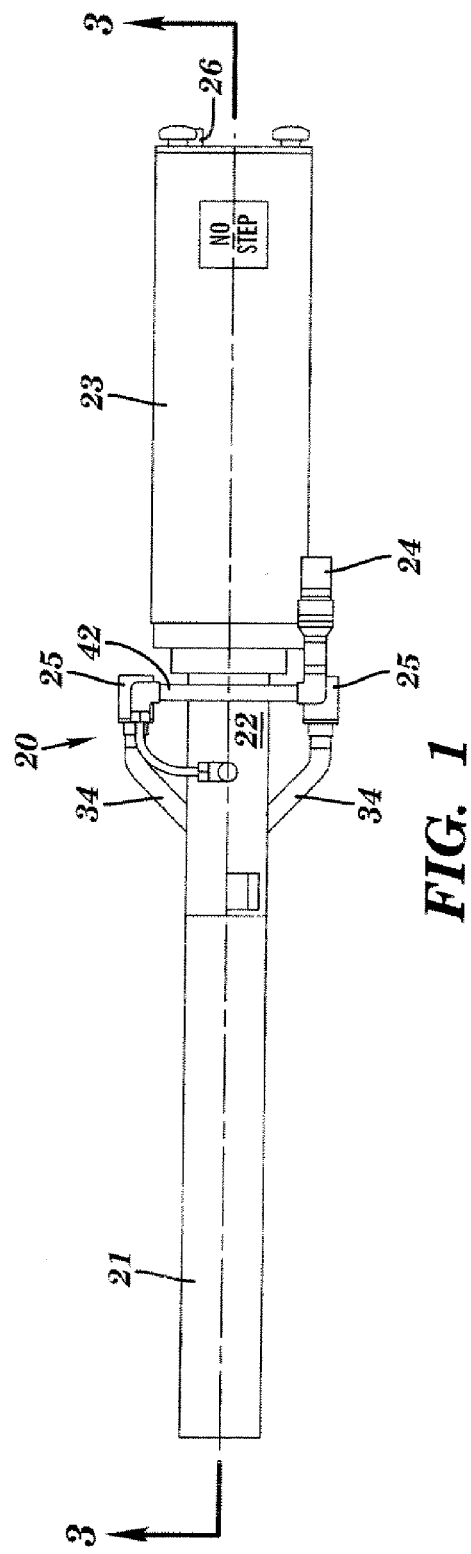
FIG. 1 is a top plan view of the fluid-powered inspection device, in accordance with one embodiment of the present invention.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangements of parts, proportion, degree, etc.) together with the specification, and are to be considered a portion of the entire written description of this invention. As used in the following description, the terms "horizontal," "vertical," "left," "right," "up" and "down," as well as adjectival and adverbial derivatives thereof (e.g., "horizontally," "rightwardly," "upwardly," etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
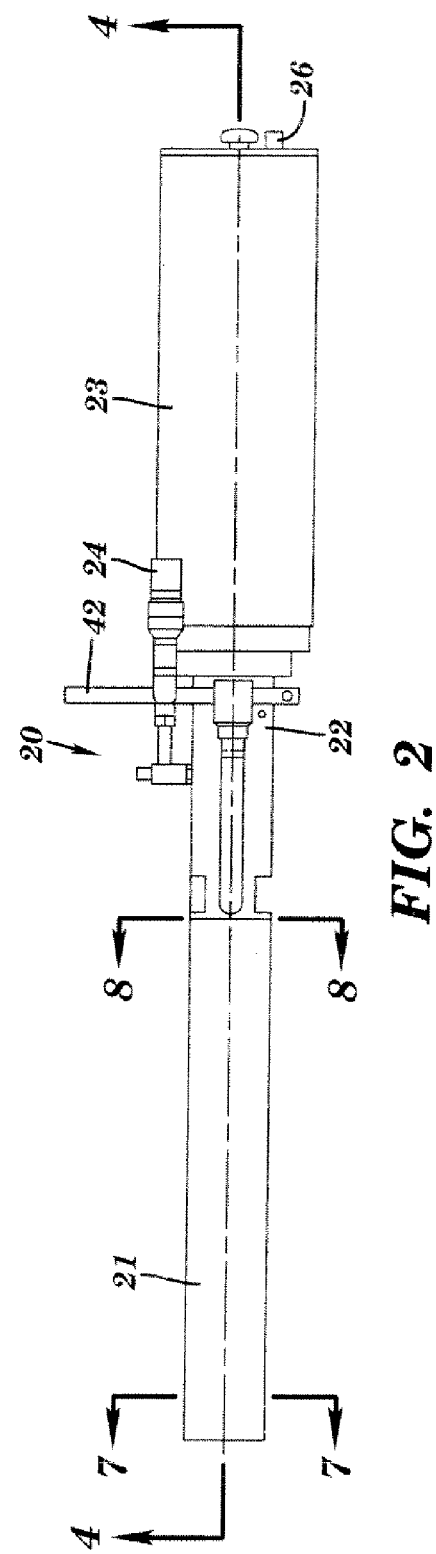
FIG. 2 is a front elevation of the inspection device shown in FIG. 1.
Figure 3:
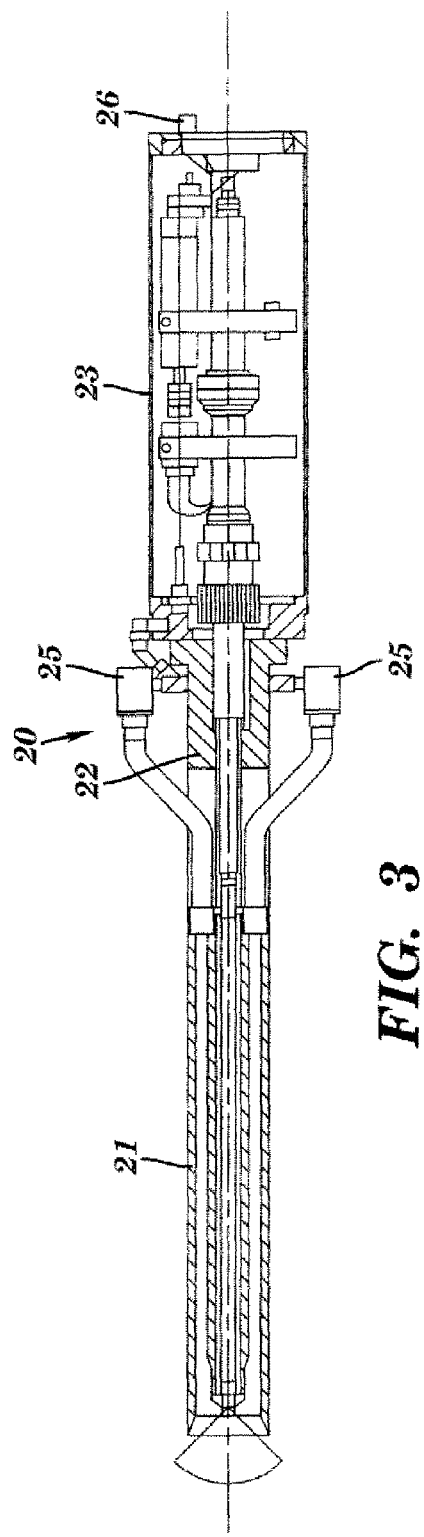
FIG. 3 is a view, partly in vertical cross-section and partly in elevation, of the inspection device, this view being taken generally on line 3—3 of FIG. 1.
Figure 4:
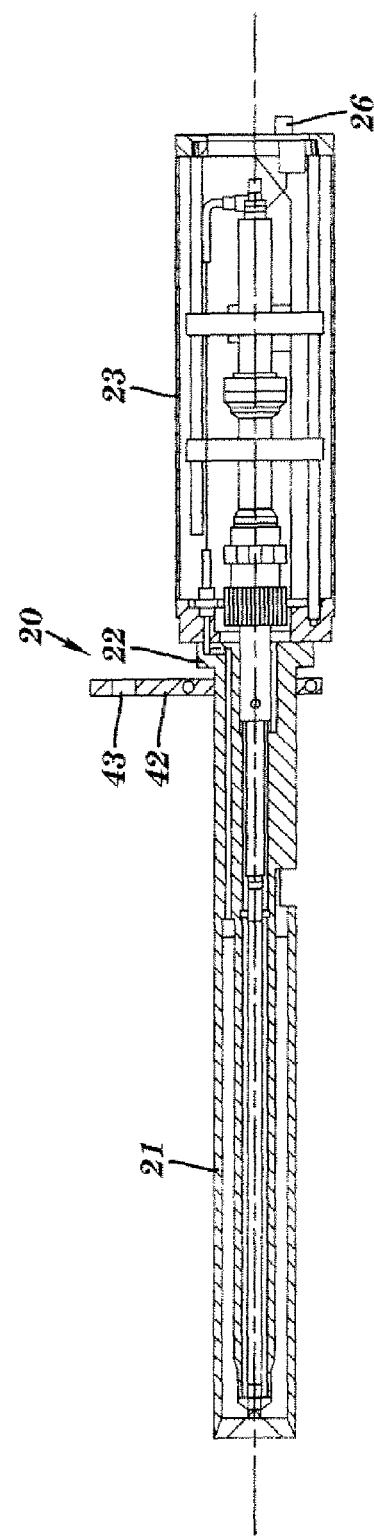
FIG. 4 is a view, partly in vertical cross-section and partly in elevation of the device, this view taken generally on line 4—4 of FIG. 2.

Referring generally to FIGS. 1–2, a fluid-powered inspection device 20 in accordance with one embodiment of the present invention is shown.

The fluid-powered inspection device 20 is formed of three major subassemblies, including a leftward subassembly 21, a middle or intermediate subassembly 22, and a rightward subassembly 23. These three subassemblies, when connected together, form the assembled body.

The fluid-powered inspection device 20 is adapted to be connected to a suitable source (not shown) of pressurized fluid, such as compressed air. Such pressurized fluid is adapted to be supplied from a suitable source (not shown) via a conduit (not shown) to an inlet fitting 24. This inlet fitting 24 then communicates the supplied fluid: (a) with a pair of lateral eductors 25, (b) with a passageway establishing a primary cooling flow through leftward subassembly 21, as described further herein below, (c) with another passageway communicating the supplied fluid with an air motor, as described further herein below, and (d) with a positive pressure source for right subassembly 23. In FIGS. 1–2, the leftward subassembly 21 generally houses an optical lens, intermediate section 22 generally houses the flow controller, and rightward section subassembly 23 generally houses the video signal processor, which is then transmitted from the camera via electrical connector 26 at the right end of the assembled device.

Figure 5:
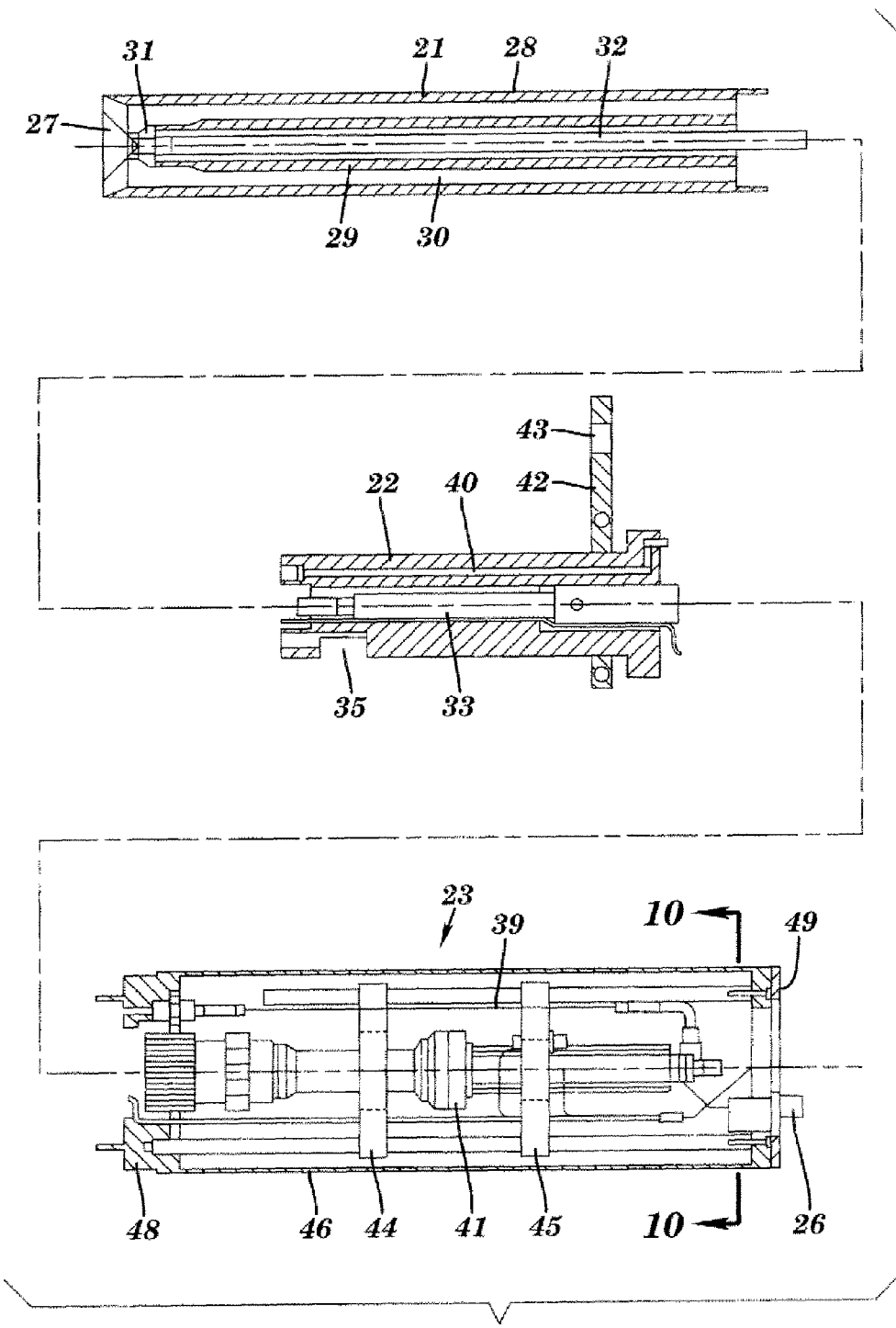
FIG. 5 is an enlarged view of the structure shown in FIG. 4, but showing the major subassemblies thereof in exploded aligned relation to one another.
Figure 6:
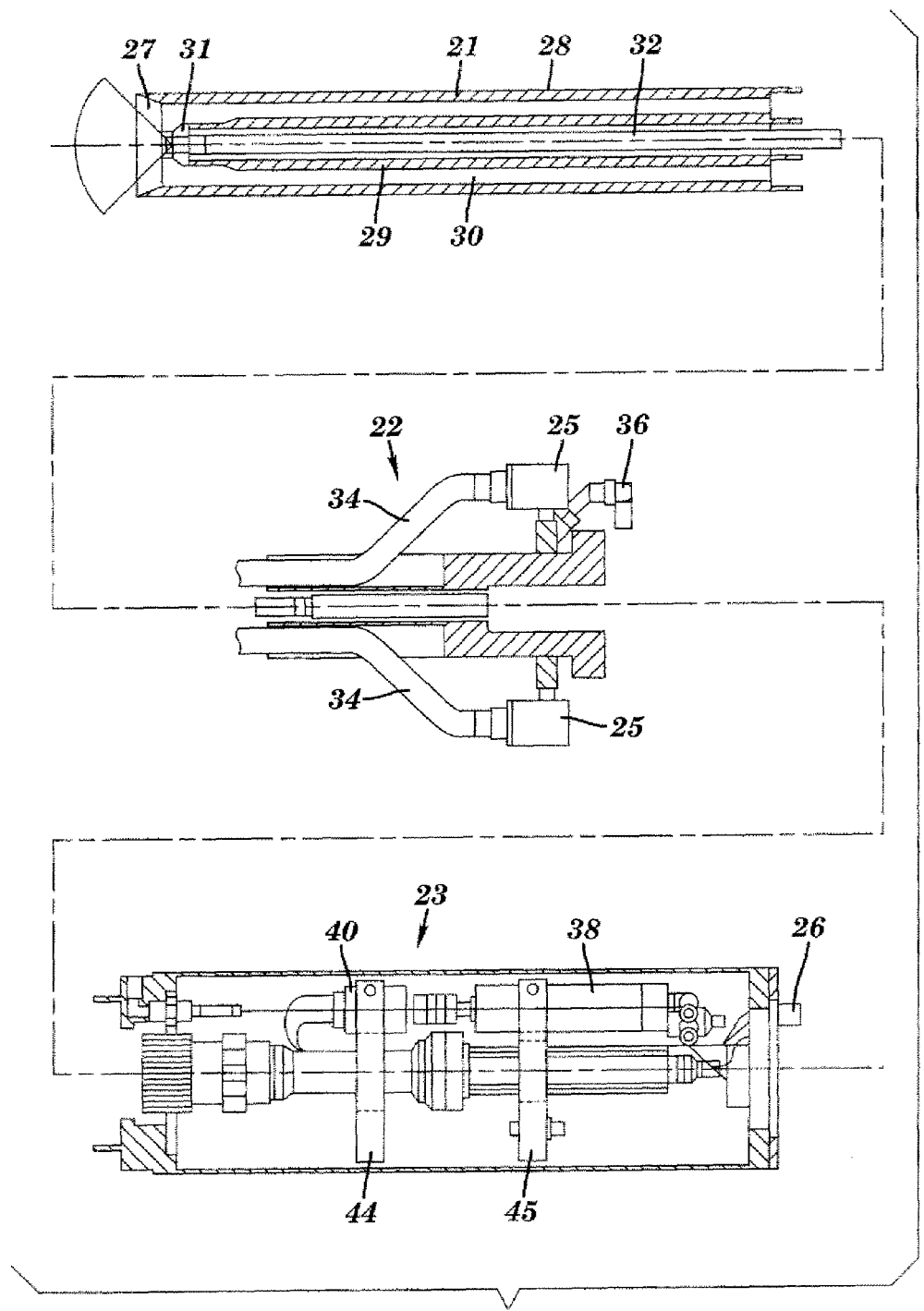
FIG. 6 is an enlarged view of the structure shown in FIG. 3, but showing the major subassemblies thereof in exploded aligned relation to one another.
Figure 7:
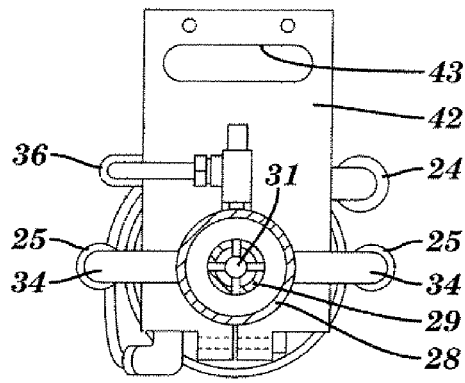
FIG. 7 is a fragmentary transverse vertical sectional view taken generally on line 7—7 of FIG. 2.
Figure 10:
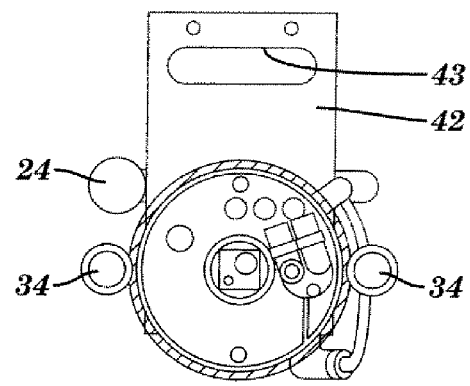
FIG. 10 is a fragmentary transverse vertical sectional view taken generally on line 10—10 of FIG. 5.
Figure 8:
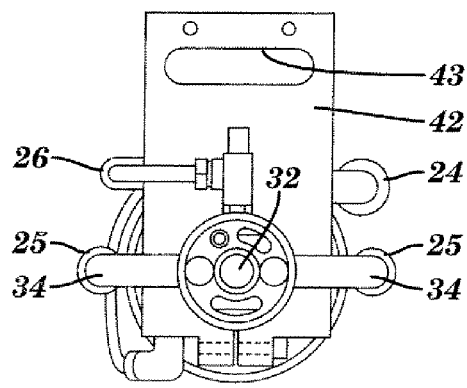
FIG. 8 is a fragmentary transverse vertical sectional view taken generally on line 8—8 of FIG. 2.

Referring now to FIGS. 5–6, the leftward subassembly 21 is shown as broadly including a horizontally-elongated thin-walled cylindrical outer tube 28, and a horizontally-elongated thin-walled cylindrical inner tube 29. These two tubes define a horizontally-elongated chamber 30 therebetween having an annular transverse cross-section. A lens assembly, generally indicated at 31, is mounted on the open left end of inner tube 29, and is positioned adjacent the open left end of outer tube 21. An objective tube, generally indicated at 32, in the form of a horizontally-elongated cylindrical rod, is arranged within the inner tube and is arranged to transmit the visual image sensed by lens 31 to the electronics contained in the other portions of the device. As will be described herein, compressed fluid is arranged to flow from right to left through chamber 30 and the annular chamber defined by the spaced relation between tube 32 and the inner wall of tube 29 to cool the optical components contained within inner tube 29, and to flush contaminants from lens 31, and to generally discharge fluid through the leftward open end 27 of the outer tube so as to permit the lens to view a suitable object to the left of the assembly. The compressed fluid supplied to the front of the inner tube, which contains the forward section of relay lens 33, is isolated from the dirty ambient air until such time as it is discharged from the assembly. The compressed fluid in this stream is intended to be clean, of high velocity, and of low volume. The philosophy behind this is that the consumption of clean compressed fluid is minimized by allowing the entrained dirty air to perform as much of the cooling as possible, and this entrained dirty air is isolated from clean air which is in direct contact with the imaging device and the lens assemblies. Hence, chamber 30 contains a mixture of compressed clean air and entrained dirty air, whereas chamber 23 and the space within the front inner tube, and hence the innermost portion of intermediate assembly 23 contains only clean, compressed air.

The intermediate subassembly 22 is shown as being a horizontally-elongated specially-configured member having a central axial through-bore which is arranged to accommodate and receive another mating optical member, generally indicated at 33, for receiving the video image received from member 32 and for transmitting it rightwardly to the camera. Compressed fluid supplied to inlet 24 is first supplied to eductor blocks 25. The educator blocks 25 then transmit fluid via conduits 34 to the right marginal end portion of chamber 30 at diametrically-spaced locations thereon. The discharged fluid jets by openings, several indicated at 35, which tends to entrain air into the jetted flow, and to pass the flow from right to left through leftward subassembly passageway 30. The supplied air is also provided, via fitting 36, to a line which communicates with air motor 38 mounted in the right subassembly at 23. Compressed fluid exiting this motor is discharged via line 39, and is supplied via conduit 40 to the right marginal end portion of left subassembly chamber 30. Thus, the fluid discharged from the air motor is added to the leftward cooling flow through passageway 30.

As shown in FIG. 6, pneumatic motor 38 is operatively arranged to drive generator 40, which, in turn, provides electrical power to a CCD adapter 41 mounted in the rightward subassembly 23. This CCD adapter is arranged to provide an electrical output signal to terminal 26 in the right end cap. Supplied fluid is also provided to the chamber within right subassembly 23 to positively pressurize this chamber with respect to the atmosphere. The air in chamber 23 is permitted to exhaust, in a controlled manner, via an exhaust restrictor located on rightwardmost surface 49 to facilitate cooling within chamber 23. A portion of the air supplied to the chamber within the front inner tube is permitted to pass rightwardly into rear chamber 23 to hold this chamber at a positive pressure relative to the atmosphere. Allowing this air to change (i.e., by controlled exhaust) facilitates a degree of cooling for the components contained therein. The intermediate part 22 is shown as having a vertical flange member, generally indicated at 42, which is provided with a transversely elongated slot 43. Air motor 38 and generator 40 are held in the illustrated relative positions via a pair of axially-spaced blocks 44, 45 respectively. The optical components are secured only within sub-assembly 22 with the forwardmost (i.e., leftwardmost) portion being supported within the nozzle at the forwardmost portion of the front inner tube 27, and this optical device supports the entire weight of the camera. The idea here is that the optical assembly and camera are mostly isolated from any vibration generated by the air motor and generator.

Figure 9:
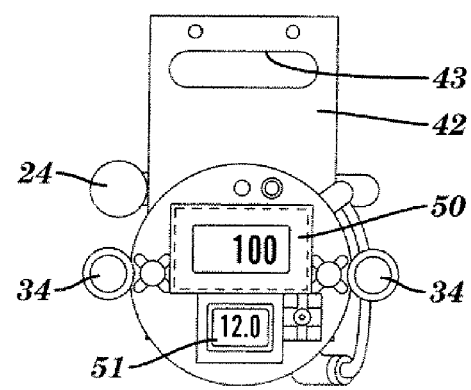
FIG. 9 is a right end elevation of the body shown in FIG. 5.

The right subassembly 23 is shown as being contained within a horizontally-elongated thin-walled outer tubular casing, generally indicated at 46. The left end of this casing is closed by an annular block 48 which is adapted to mate with the right marginal end of intermediate section 22. The right end of subassembly 23 is closed by a rightward cap 49. As best shown in FIG. 9, cap 49 has a first visual display which is operatively arranged to display 50 which is arranged to display the temperature sensed by the camera, and has a second display 51 which is operatively arranged to display the voltage produced by the generator. The apportionment of flow to the air motor vis-a-vis the other flow passages may be controlled from within the apparatus.

Thus, the present invention provides a fluid-powered inspection device capable of being operated in a heated and/or otherwise contaminated environment. The device has an assembled body which includes a tubular shell 28 terminating in a leftward open end; an imaging device having a portion 32 arranged within the tubular shell and spaced relation thereto so as to define an annular chamber 30 there between, the imaging device having an eye 31 positioned adjacent the leftward open end; a fluid powered motor 38 arranged within the body, this motor having a fluid inlet adapted to be connected to a suitable source of compressed fluid and having a fluid outlet; a generator 40 arranged within the body and operatively coupled to the motor, the generator being arranged to supply electrical power to the imaging device as a function of the fluid flow passing through the motor; and wherein the fluid discharged from the motor also passes through the annular chamber and is discharged through an open end. Thus, the compressed fluid supplied to the motor both powers and provides a medium for cooling the imaging device and keeping the eye clean.

The present invention contemplates that many changes and modifications may be made. For example, the one embodiment shown in the drawings is intended to be illustrative of an embodiment falling within the scope of the claims. Thus, for example, the body could be made in three subassemblies, or could be made in a greater or lesser number, as desired. The salient point here is that a portion of the imaging device be arranged to be cooled by the flow of fluid thereabout. This flow of fluid also serves to keep clean the eye at the end thereof, and to blow contaminants away from the space or volume to the left of the eye, so as not to hinder the sight thereof. The supplied fluid may, in most cases, be compressed air. However, fluids other than compressed air might alternatively be provided. Thus, the structure of the body and the imaging device may be readily changed or modified as desired. In this regard, it is contemplated that the imaging device may be a video camera, an infrared camera, or some other type of device, such as a pyrometer or the like. These are only a few examples of things that are intended to fall within the broad generic description of "imaging device."

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A fluid-powered imaging system comprising:
    a housing;
    an imaging device arranged within the housing;
    a fluid-powered motor arranged within the housing;
    an electrical generator operatively coupled to and powering the imaging device, the electrical generator being driven by and operably coupled to the fluid-powered motor and arranged within the housing; and
    a fluid distribution system for receiving and supplying a portion of a fluid to operate the fluid-powered motor, wherein the fluid distribution system is configured to direct a first portion of the fluid exhausted by the fluid-powered motor past a portion of the fluid distribution system located adjacent to at least a portion of the imaging device to cool the imaging device.

2. The system according to claim 1 wherein the fluid distribution system is configured to direct another portion of the fluid past at least the portion of the imaging device.

3. The system according to claim 1 wherein at least a portion of the fluid distribution system is configured to direct at least the first portion and a second portion of the fluid by an eye portion of the imaging device to keep the eye portion substantially free from contaminants.

4. The system according to claim 2 wherein the fluid comprises air or nitrogen.

5. The system according to claim 1 wherein the imaging device has an eye portion positioned adjacent to an open end of the housing.

6. The system according to claim 1 further comprising at least one eductor coupled to an outlet for fluid discharged from the fluid-power motor, the eductor entraining air within the housing with the discharged fluid.

7. The system according to claim 1 wherein the imaging device comprises a television camera, a video camera, an infrared camera or a pyrometer.

8. A method of operating an imaging device, the method comprising:
    supplying a fluid from a source;
    generating power from a flow of at least a portion of the fluid;
    powering the imaging device with the generated power; and
    cooling at least a portion of the imaging device with at least the portion of the fluid exhausted from the generation of the power.

9. The method according to claim 8 further comprising cooling the imaging device by directing at least a portion of the flow of the fluid past the imaging device.

10. The method according to claim 8 further comprising directing at least a portion of the flow of the fluid past an eye portion of the imaging device to keep the eye portion substantially free from contaminants.

11. The method according to claim 8 wherein an amount of the generated power is in proportion to a rate of the flow of the fluid.

12. The method according to claim 8 further comprising capturing an image through an eye portion of the imaging device.

13. The method according to claim 8 wherein the fluid comprises air or nitrogen.

14. A fluid-powered imaging system comprising:
    an imaging device;
    a fluid-powered motor;
    an electrical generator operatively coupled to the fluid-powered motor, the generator being driven by the fluid-powered motor to power the imaging device;
    a housing enclosing at least a portion of the fluid-powered motor, the generator and the imaging device; and
    a fluid distribution system for receiving and supplying a first portion of a fluid to power the fluid-powered motor, at least a portion of the fluid distribution system being located adjacent to a portion of the imaging device to cool the imaging device with the first portion and a second portion of the fluid, and at least a portion of the fluid distribution system being configured to direct at least the first portion and the second portion of the fluid by an eye portion of the imaging device to keep the eye portion substantially free from contaminants.

15. The system according to claim 14 wherein the fluid distribution system comprises one or more chambers within the housing.

16. The system according to claim 14 further comprising at least one eductor coupled to an outlet for fluid discharged from the fluid-power motor, the eductor entraining air within the housing with the discharged fluid.

17. The system according to claim 14 wherein the imaging device has an eye portion positioned adjacent to an open end of the housing.

18. The system according to claim 14 wherein the fluid comprises air or nitrogen.

19. The system according to claim 14 wherein the imaging device comprises a television camera, a video camera, an infrared camera or a pyrometer.

20. A method of operating an image taking device using fluid, the method comprising:
    supplying a fluid from a source;
    generating power from a first portion of a flow of the fluid;
    powering an imaging device with the generated power;
    cooling the imaging device by directing at least the first portion and a second portion of the fluid past the imaging device; and
    directing at least the first portion and the second portion of the fluid past an eye portion of the imaging device to keep the eye portion substantially free from contaminants.

21. The method according to claim 20 wherein an amount of the generated power is in proportion to a rate of the flow of the fluid.

22. The method according to claim 20 further comprising capturing an image through an eye portion of the imaging device.

23. The method according to claim 20 wherein the fluid comprises air or nitrogen.

24. A fluid-powered inspection device, the device comprising:
   a body having a tubular shell terminating in an open end;
   an imaging device having a portion arranged within the tubular shell in a spaced relation thereto to define an annular chamber therebetween, the imaging device having an eye portion positioned adjacent to the open end;
   a fluid-powered motor arranged within the body, the fluid-powered motor having a fluid inlet for connection to a suitable source of fluid and having a fluid outlet to discharge the fluid; and
   a generator arranged within the body and operatively coupled to the fluid-powered motor, the generator supplying electrical power to the imaging device as a function of a fluid flow passing through the fluid-powered motor, the fluid discharged from the fluid-powered motor fluid outlet passing through the annular chamber and being discharged through the open end, cooling the imaging device, and keeping the eye portion substantially free from contaminants.

25. The device according to claim 24 further comprising an eductor, the fluid discharged from the fluid-powered motor fluid outlet passing through the eductor and entraining air from within the chamber into the fluid discharged through the open end.

26. The device according to claim 25 wherein the fluid supplied from the suitable source is combined with the fluid discharged from the fluid-powered motor outlet upstream of the eductor.

27. The device according to claim 24 wherein the eye portion further comprises at least one lens.

28. The device according to claim 24 wherein the fluid is air.

29. The device according to claim 24 wherein the imaging device is a video camera, a television camera, an infrared camera or a pyrometer.

* * * * *